United States Patent [19]
Kamigawa et al.

[11] Patent Number: 6,139,592
[45] Date of Patent: Oct. 31, 2000

[54] PROCESS AND APPARATUS FOR PRODUCING ORGANIC SOLID ELECTROLYTE CAPACITOR

[75] Inventors: Hidenori Kamigawa, Higashiosaka; Youichi Kojima; Takeshi Takamatsu, both of Daito; Yasutoshi Sugita, Hirakata; Yasuhiko Ito, Daito; Tomohiro Nishio, Osaka, all of Japan

[73] Assignees: Sanyo Electric Co., Ltd., Morigichi; Sanyo Electronic Components Co., Ltd., Daito, both of Japan

[21] Appl. No.: 09/098,302

[22] Filed: Jun. 18, 1998

[30] Foreign Application Priority Data

Jun. 19, 1997 [JP] Japan ................................. 9-162299
Nov. 14, 1997 [JP] Japan ................................. 9-313156

[51] Int. Cl.⁷ ....................................................... H01G 9/00
[52] U.S. Cl. ...................... 29/25.03; 361/523; 361/529; 361/535; 204/227; 204/228
[58] Field of Search ........................... 29/25.03; 361/509, 361/541, 517, 523, 529, 534, 540, 435; 204/421, 210, 211, 228, 280, 285, 287, 297 R, 223, 227

[56] References Cited

U.S. PATENT DOCUMENTS

| | | | |
|---|---|---|---|
| 3,825,802 | 7/1974 | Kumagai et al. | 317/230 |
| 4,017,773 | 4/1977 | Cheseldine | 361/433 |
| 4,067,786 | 1/1978 | Hilbert et al. | 204/56 R |
| 4,090,288 | 5/1978 | Thompson et al. | 29/570 |
| 4,785,380 | 11/1988 | Harakawa et al. | 361/433 |

OTHER PUBLICATIONS

Unexamined Japanese Patent Publication HEI. 5–21,286 together with Patent Abstract of Japan thereof.
Unexamined Japanese Patent Publication HEI. 7–245,245 together with Patent Abstract of Japan thereof.
Unexamined Japanese Patent Publication HEI. 8–255,732 together with Patent Abstract of Japan thereof.

*Primary Examiner*—John F. Niebling
*Assistant Examiner*—Ha Tran Nguyen
*Attorney, Agent, or Firm*—Armstrong, Westerman, Hattori, McLeland & Naughton

[57] ABSTRACT

The object of the invention is to provide a process for producing an organic solid electrolyte capacitor which is diminished in leakage current, and an apparatus for use in practicing the process. The process includes the steps of completing a capacitor element by forming a dielectric oxide film over an anode body of valve metal and subsequently forming a cathode layer of solid conductive organic material over the oxide film, subjecting the capacitor element to an aging treatment, and forming a shell around the capacitor element. The apparatus, which is an aging apparatus for such capacitor elements, comprises a box for accommodating a plurality of capacitor elements, a conductive buffer layer provided inside the box, a conductive holding member disposed on the box for attaching thereto the outer end of anode lead of each of the capacitor elements, with a silver paste layer of the element in contact with the buffer layer, a current limiter connected to the buffer layer for restricting the current to be passed through the capacitor element to not greater than a predetermined value, and a power source having positive and negative electrodes connected to the holding member and the current limiter, respectively.

18 Claims, 4 Drawing Sheets

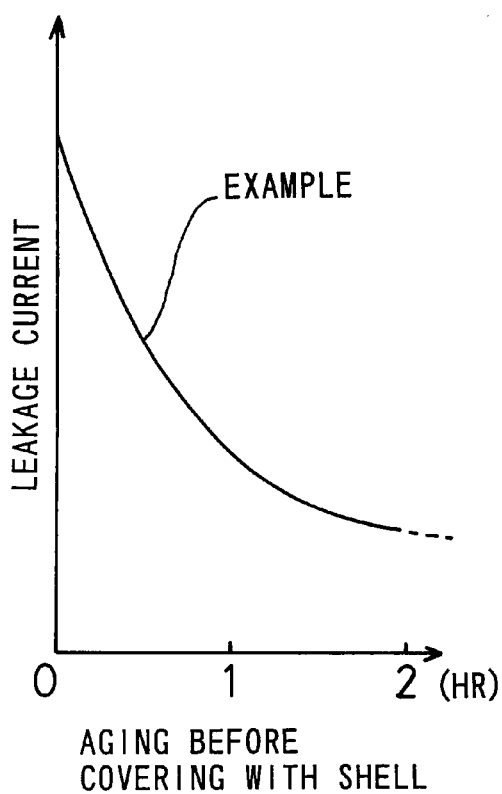 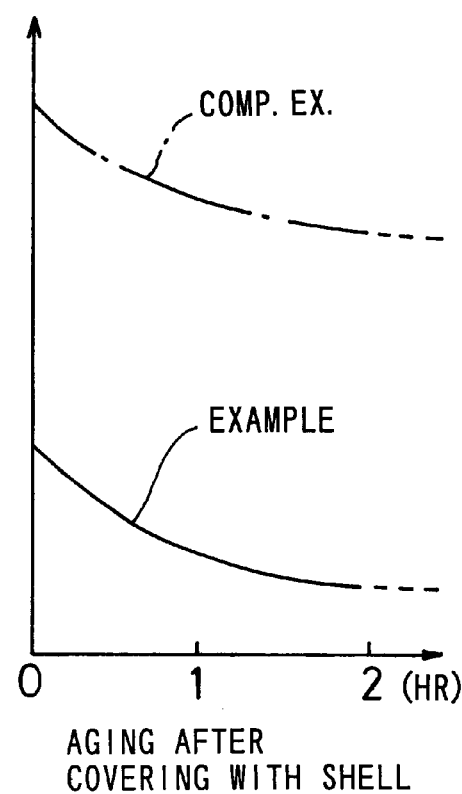

PROCESS AND APPARATUS FOR PRODUCING ORGANIC SOLID ELECTROLYTE CAPACITOR

FIELD OF THE INVENTION

The present invention relates to a process for producing organic solid electrolyte capacitors comprising a cathode layer of solid conductive organic material, and to an apparatus for use in practicing the process. More particularly, the invention relates to an aging step in the process for producing organic solid electrolyte capacitors.

BACKGROUND OF THE INVENTION

Generally, electrolytic capacitors comprise an anode body of a valve metal such as Al (aluminum) or Ta (tantalum), a dielectric oxide film formed over the anode body by an electrolytic oxidation treatment, and a cathode layer of electrolyte, $MnO_2$ (manganese dioxide), conductive organic compound or like conductive substance formed over the oxide film in intimate contact therewith. The term "valve metal" as used herein refers to a metal which forms a highly compacted durable dielectric oxide film when subjected to an electrolytic oxidation treatment. Such metals include Ti (titanium) and Nb (niobium) in addition to Al and Ta. Since the dielectric oxide film has a very small thickness, it is possible to prepare electrolytic capacitors having a smaller size and greater capacity than other capacitors such as paper capacitors and film capacitors.

Electrolytic capacitors wherein a solid conductive substance, such as $MnO_2$ or conductive organic compound, is used for the cathode layer are called solid electrolyte capacitors. Among these, those wherein a solid conductive organic compound is used are termed organic solid electrolyte capacitors. Examples of such conductive organic compounds are polypyrrole, polyaniline and like conductive high-molecular-weight compounds and TCNQ (7,7,8,8,-tetracyanoquinodimethane) complex salts.

These conductive organic compounds are higher than electrolytes and $MnO_2$ in electric conductivity. Accordingly, the organic solid electrolyte capacitors wherein the conductive organic compound is used for the cathode layer are lower in ESR (equivalent series resistance) and more excellent in high-frequency characteristics than other electrolytic capacitors wherein the cathode layer is prepared from an electrolyte or $MnO_2$. These capacitors are presently used in various electronic devices.

A description will be given of an example of conventional process for producing solid electrolyte capacitors.

First, an anode lead is attached to an anode body, which is then subjected to an electrolytic oxidation treatment to form a dielectric oxide film over the anode body. A cathode layer of solid conductive substance is formed over the oxide film. Over the cathode layer are formed a carbon layer and subsequently a silver paste layer, whereby a capacitor element is completed. A metal terminal plate is attached to each of the anode lead and the silver paste layer of the capacitor element. The assembly is then covered with a resin as by injection molding over the capacitor element and partly over the metal terminal plates to form a shell and completely fabricate a solid electrolyte capacitor.

Generally with electrolytic capacitors, damage caused to the dielectric oxide film during the fabrication process leads to increased leakage current. To reduce the increased leakage current, the capacitor element as encased in the shell is treated for aging. For the aging treatment, a dc voltage is applied to the capacitor element, which is encased in the shell, in an environment of the highest temperature at which the capacitor is to be used (or higher temperature), whereby the dielectric oxide film is restored to diminish the capacitor leakage current.

However, in the case where $MnO_2$, conductive organic compound or like solid conductive substance is used for the cathode layer, the aging treatment encounters difficulty in restoring the dielectric oxide film and is less effective to reduce the leakage current in this case than when the electrolyte is used. Consequently, the ratio of rejects with a leakage current value exceeding the required level can not be limited to a low value.

The present inventor has carried out various experiments on organic solid electrolyte capacitors and consequently found that the leakage current can be remarkably diminished by conducting the aging treatment not after but before forming the shell. This finding has matured to the following solution to the foregoing problem.

An object of the present invention is to provide a process for producing organic solid electrolyte capacitors which are reduced in leakage current, and an apparatus suitable for practicing this process.

SUMMARY OF THE INVENTION

To fulfill the above object, the present invention provides a process for producing an organic solid electrolyte capacitor wherein a dielectric oxide film is formed over an anode body of valve metal, and a cathode layer of solid conductive organic material is formed over the dielectric oxide film to complete a capacitor element. The capacitor element is subjected to an aging treatment, and a shell is thereafter formed around the capacitor element by injection molding or other method.

According to the process described, it is desired to subject the capacitor element to the second aging treatment after forming the shell.

The apparatus provided by the invention is an apparatus for aging the capacitor element. The aging apparatus comprises a box for accommodating a plurality of capacitor elements, a conductive buffer layer provided inside the box, a conductive holding member for attaching thereto the outer end of an anode lead of each of the capacitor elements and holding each capacitor element with a silver paste layer thereof in contact with the buffer layer, a current limiter connected to the buffer layer for restricting the current to be passed through the capacitor element to not greater than a predetermined value, and a power source having a positive electrode connected to the holding member and a negative electrode connected to the current limiter.

Examples of useful conductive buffer layers are a carbon sheet and an accumulation of granular carbon.

BRIEF DESCRIPTION OF THE DRAWINGS

FIG. 3A is a graph qualitatively showing variations in leakage current with time, as achieved by the first aging treatment in an example of the invention;

FIG. 3B is a graph qualitatively showing variations in leakage current with time, as achieved by the second aging treatment in the example of the invention, and as attained by an aging treatment conducted in a comparative example;

DETAILED DESCRIPTION OF THE INVENTION

The present invention will be described below in greater detail.

1. Embodiment of Production Process

Figure 6:
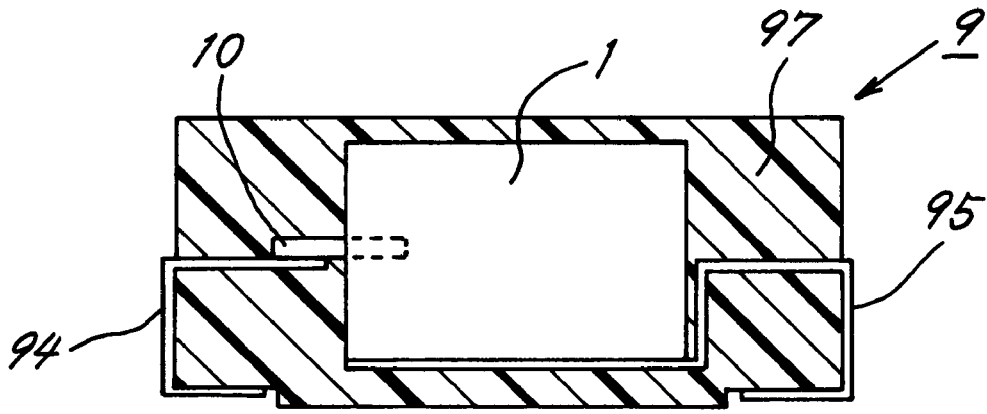
FIG. 6 is a view in section of a conventional organic solid electrolyte capacitor in the form of a chip.
Figure 7:
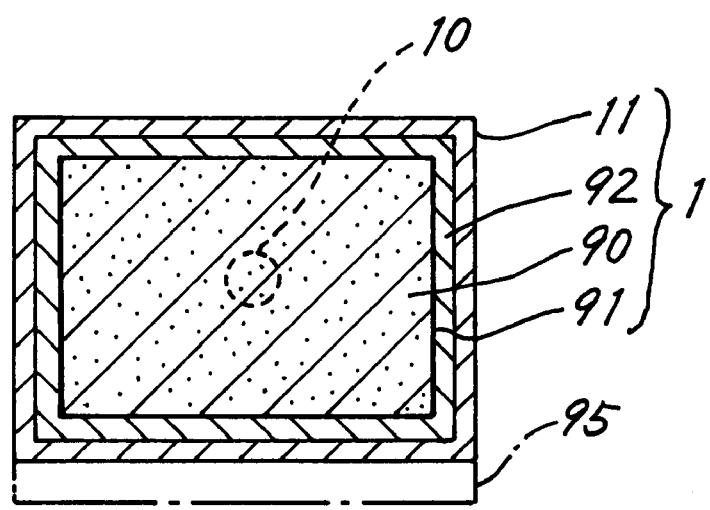
FIG. 7 is a sectional view showing a capacitor element included in the capacitor of FIG. 6.

FIGS. 6 and 7 show a chiplike organic solid electrolyte capacitor 9 produced by the process of the invention. The construction of the capacitor 9 is known. To produce the capacitor 9, a sintered body is prepared from a valve metal such as Al or Ta for use as a porous anode body 90, and an anode lead 10 is attached to the anode body 90. Next, a dielectric oxide film 91 is formed over the anode body 90 by an electrolytic oxidation treatment. A cathode layer 92 is subsequently formed over the oxide film 91 from a conductive organic material such as a conductive high-molecular-weight compound or TCNQ complex salt by a known method. A carbon layer and then a silver paste layer 11 are formed over the cathode layer 92 to complete a capacitor element 1. The steps described above are the same as in the conventional process.

According to the invention, the capacitor element 1 is subjected to the first aging treatment as will be described later.

The following steps are the same as in the conventional process. Metal terminal plates 94, 95 providing a lead frame are attached respectively to the anode lead 10 and the silver paste layer 11 of the capacitor element 1. Subsequently, the assembly is covered with a resin as by injection molding over the capacitor element 1 and partly over the terminal plates 94, 95 adjoining the element 1 to form a shell 97. The element 1 covered with the shell is then subjected to the second aging treatment. The metal terminal plates 94, 95 extending from the shell 97 are bent along the shell 97, whereby an organic solid electrolyte capacitor 9 is completed in the form of a chip.

In the following example and comparative example, sintered Ta bodies are used as anode bodies 90. However, the material is not limited to Ta; sintered bodies of desired valve metal are also usable. Although polypyrrole is used as the conductive organic material for forming cathode layers 92 in the following example and comparative example, the material is not limited to polypyrrole but can be any desired conductive organic material. A linear material is used as anode leads 10 in the following example and comparative example, whereas the material is not limited to such a material but can be in the form of a plate or strip or in any other form.

The invention will be described below with reference to an example and a comparative example.

a. Example

A sintered Ta body having an anode lead attached thereto was electrolytically oxidized in an aqueous solution of phosphoric acid to form a dielectric oxide film over the sintered body. Next, a cathode layer of polypyrrole was formed over the oxide film by a well-known chemical polymerization process or electrolytic polymerization process. A carbon layer and then a silver paste layer were formed over the cathode layer to complete a capacitor element.

Figure 1:
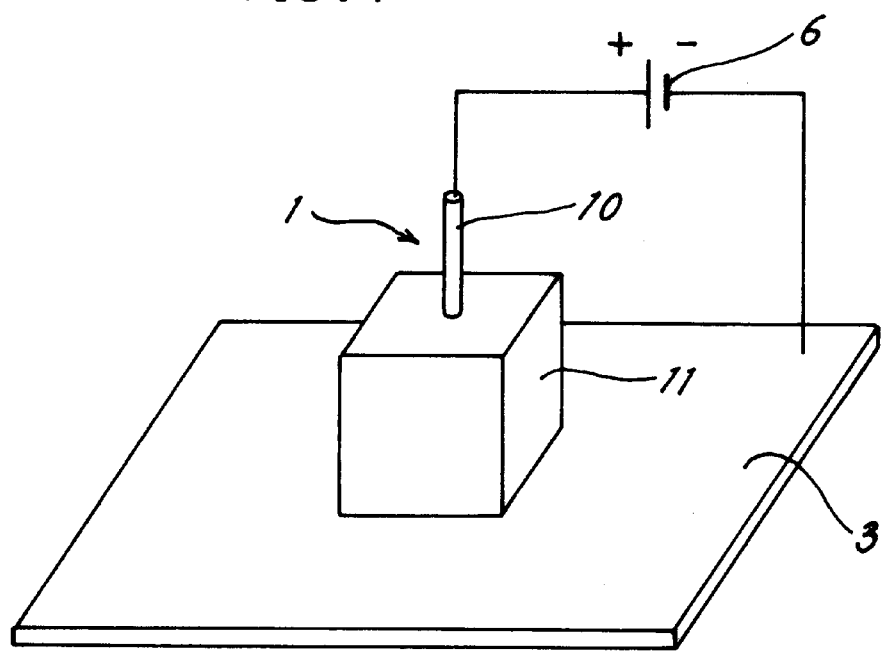
FIG. 1 is a perspective view showing an embodiment of the invention for conducting the first aging treatment.

As shown in FIG. 1, a platelike carbon sheet 3 was subsequently heated on a hot plate (not shown), the surface temperature of the carbon sheet 3 was adjusted to 125° C., and the capacitor element 1 was thereafter placed on the carbon sheet 3, with the silver paste layer 11 of the element 1 in contact with the carbon sheet 3. The positive electrode of a power source 6 was connected to the anode lead 10 of the capacitor element 1, and the negative electrode thereof to the carbon sheet 3. A rated voltage was applied to the capacitor element 1 for 2 hours from the power source 6 for the first aging treatment. This aging treatment resulted in greatly reduced leakage current as qualitatively indicated in the solid line of FIG. 3A.

It is desired that the carbon sheet 3 be in the form of felt so as to avoid impact on the capacitor element 1 to be placed thereon. From the viewpoint of heat conduction and electric resistance, it is also desired that the carbon sheet 3 be 5 to 20 mm in thickness, 0.1 to 0.2 $g/cm^3$ in density and up to 7 ohm-cm in volume resistivity. The carbon sheet 3 used in this example was feltlike, 7 mm in thickness, 0.12 $g/cm^3$ in density and 6.3 ohm-cm in volume resistivity.

Next, a metal terminal plate was welded or adhered to each of the anode lead 10 and the silver paste layer 11 of the capacitor element 1 thus aged, and the assembly was covered with an epoxy resin by injection molding over the element 1 and partly over the metal terminal plates adjoining thereto to form a shell. The resulting capacitor element was then subjected to the second aging treatment by applying thereto a rated voltage for 2 hours at a temperature of 125° C. The leakage current resulting from this treatment was slightly lower than the leakage current attained by the first aging treatment as qualitatively indicated by the solid line of FIG. 3B. Incidentally, FIGS. 3A and 3B show that the leakage current immediately before the second aging treatment is indicated as being slightly greater than the leakage current resulting from the first aging treatment. The increased leakage current is attributable to the possible damage caused by the provision of the shell to the dielectric oxide film.

The metal terminal plates extending from the shell were thereafter bent along the shell, whereby an organic solid electrolyte capacitor was completed in the form of a chip.

Figure 2:
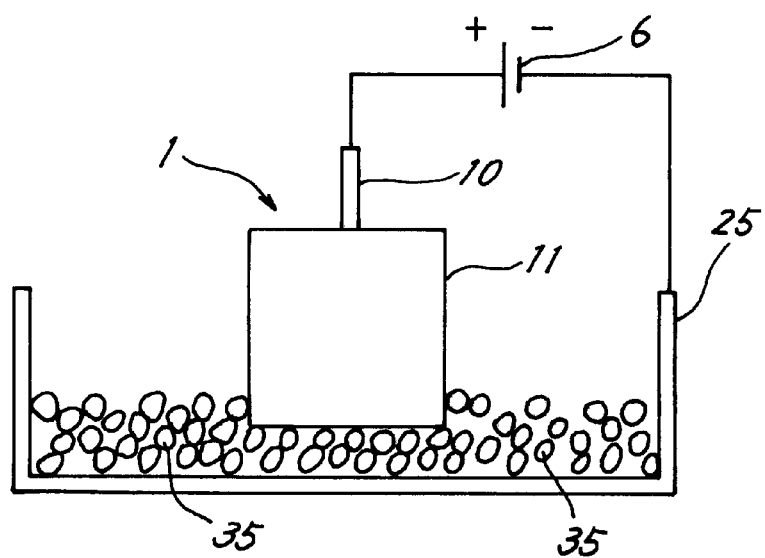
FIG. 2 is a perspective view showing another embodiment of the invention for conducting the first aging treatment.

FIG. 2 shows another apparatus embodying the invention. For conducting the first aging treatment by this embodiment, the carbon sheet 3 shown in FIG. 1 was replaced by granular carbon 35 as placed in the form of a layer over the bottom wall of a metal container 25. To hold the silver paste layer 11 of the capacitor element 1 in full contact with the granular carbon 35, the capacitor element 1 was placed in with its lower portion buried in the layer of granular carbon 35. The positive electrode of a power source 6 was connected to the anode lead 10 of the capacitor element 1, and the negative electrode thereof to the metal container 25. A rated voltage was applied to the capacitor element 1 for 2 hours from the power source 6 for the first aging treatment, whereby the same result as above was obtained.

b. Comparative Example

For comparison with Example given above, an organic solid electrolyte capacitor was prepared in the same manner as in Example without aging the capacitor element during the fabrication of the element itself. This production process is the same as in the prior art. The aging treatment conducted after the formation of the shell entailed only a slight reduction in leakage current as indicated in the chain line of FIG. 3B, with the result that the leakage current attained by the aging treatment was much greater than that achieved by Example.

c. Results of Inspection

One hundred samples were prepared in each of Example and Comparative Example and inspected with the results given in Table 1.

TABLE 1

|  | Example | Comp. Ex. |
| --- | --- | --- |
| No. of shorted rejects | 12 | 15 |
| No. of samples acceptable in leakage current | 78 | 9 |
| No. of rejects due to leakage current | 10 | 76 |
| Average value of leakage current ($\mu$A) | 8.9 | 38.5 |

With reference to Table 1, the shorted rejects are the samples wherein the current flowing between the anode body and the cathode layer increased to several milliamperes during aging and which are excluded during fabrication due to an irreversible break in the dielectric oxide film. Accordingly, the shorted rejects are not included in the samples acceptable in leakage current, the rejects due to leakage current and the samples for which the average value of leakage current is calculated. Example and Comparative Example are comparable in the incidence of shorted rejects.

The samples acceptable in leakage current are completed capacitors wherein the leakage current after the application of voltage for 10 seconds fulfills the requirement. The rejects due to leakage current are samples failing to fulfill the requirement as to the leakage current. The average value of leakage current is calculated for both the acceptable samples and the rejects due to leakage current.

Table 1 reveals that the average value of leakage current is much smaller in Example than in Comparative Example, further showing that the number of samples acceptable in leakage current is exceedingly greater in Example than in Comparative Example.

d. Effect of Aging

When completed electrolytic capacitors are treated for aging, the leakage current generally diminishes through the following mechanism. If the dielectric oxide film of the electrolytic capacitor becomes locally damaged during fabrication, the damaged portion is lower in withstand voltage than the undamaged portion. When voltage is then applied to the capacitor, the current concentrates on the damaged portion of the oxide film, oxidizing the valve metal of the damaged portion to restore the oxide film. As a result, the leakage current of the electrolytic capacitor diminishes.

However, in the case of organic solid electrolyte capacitors wherein a conductive high-molecular-weight compound, organic semiconductor or like organic conductive material is used for the cathode layer, the current concentrating on the damaged portion of the dielectric oxide film produces Joule heat, which degrades the organic conductive material to an insulator at the location adjacent the damaged portion. Presumably, this leads to diminished leakage current.

The results of Example and Comparative Example given above appear to indicate that in the process of the invention wherein the capacitor element is aged before the provision of the shell, the capacitor element reacts with some substance in the atmosphere to result in promoted degradation of the organic conductive material to an insulator, leading to a great diminution of leakage current.

e. Advantage of the Invention

According to the present invention, the capacitor element is aged before covering with the shell, whereby the leakage current can be remarkably diminished. The invention therefore reduces the incidence of rejects failing to fulfill the requirement as to leakage current, consequently improving the yield of the product.

Although the metal terminal plates were attached to the capacitor element after the first aging treatment in Example given above, the first aging treatment, which is to be conducted with the capacitor element exposed to the atmospheric air, may be carried out after the metal terminal plates have been attached to the element.

Further because the first aging treatment achieves a remarkable reduction in leakage current, the aging treatment conventionally conducted after the formation of the shell need not always be performed.

2. Embodiments of Production Apparatus a. Embodiment 1

Figure 4:
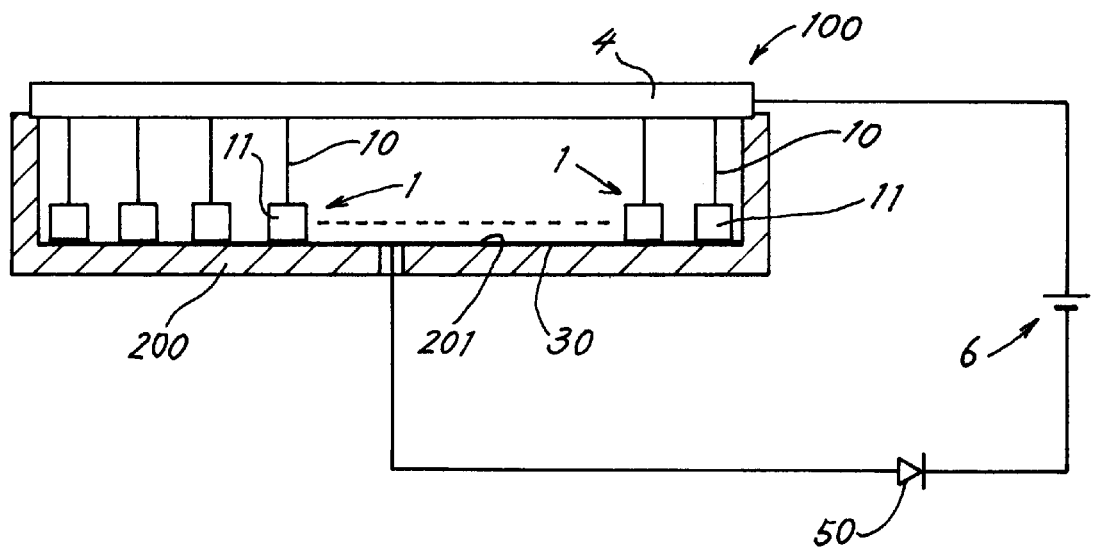
FIG. 4 is a diagram showing an aging apparatus.

FIG. 4 is a diagram showing an apparatus 100 for aging a multiplicity of capacitor elements 1. Generally when many capacitor elements 1 are to be produced, many anode bodies 90 are sent to a process for producing capacitor elements 1 by a conductive carrier bar 4, with the outer end of each anode lead 10 attached to the carrier bar 4. The capacitor elements 1 are produced as attached to the carrier bar 4. The capacitor elements 1 as completed are transported to the aging apparatus 100 by the carrier bar 4.

The aging apparatus 100 comprises a box 200 for accommodating many capacitor elements 1 attached to the carrier bar 4. A carbon sheet 30 is provided on the bottom surface 201 of the box 200 over the approximately entire area thereof. The carbon sheet 30 is in the form of a thin plate prepared from a conductive material containing graphite.

The many capacitor elements 1 are held to the conductive carrier bar 4, with the outer end of each anode lead 10 attached to the bar 4 as described above. The carrier bar 4 is disposed on the box 200 so that the silver paste layer 11 of each capacitor element 1 is in contact with the carbon sheet 30. The carrier bar 4 is electrically connected to the positive electrode of a power source 6, while the carbon sheet 30 is electrically connected to the negative electrode of the power source 6 by way of a current limiter for blocking an excess current. The current limiter 50 is a device for restricting a flow of current in excess of a predetermined value. The limiter is, for example, a constant-current diode.

It is known that the aging treatment achieves a high efficiency when a dc voltage is applied to the capacitor element 1 in an environment of the highest temperature around which the capacitor is to be used. Accordingly, the box 200 is provided with means for heating the carbon sheet 30 or the air inside the box 200 to a predetermined temperature although not shown in the drawing.

Preferably, the box 200 is made of an insulating material, or the portions of the box 200 to be in contact with the carbon sheet 30 and the carrier bar 4 are covered with an insulating thin sheet or coating.

It is also desired to make the carrier bar 4 from a metal since the bar 4 needs to be conductive and to have rigidity to support a plurality of capacitor elements 1.

It is further desired that a plurality of carrier bars 4 be arranged on the box 200, with a multiplicity of capacitor elements 1 arranged on each bar 4.

The apparatus 100 of the foregoing construction is used for the first aging treatment by heating the carbon sheet 30 or the air inside the box 200 to a predetermined temperature (e.g., 125+5° C.) with the heating means, and applying a rated voltage by the power source 6 to the carrier bar 4 and the carbon sheet 30 for a specified period of time (e.g., 2 hours).

The capacitor elements 1 subjected to the first aging treatment are thereafter removed from the carrier bar 4 and attached to lead frames. As already described, the capacitor elements 1 are then covered with an epoxy resin by injection molding to form respective shells, followed by the second aging treatment, whereby organic solid electrolyte capacitors are completed each in the form of a chip.

b. Embodiment 2

Figure 5:
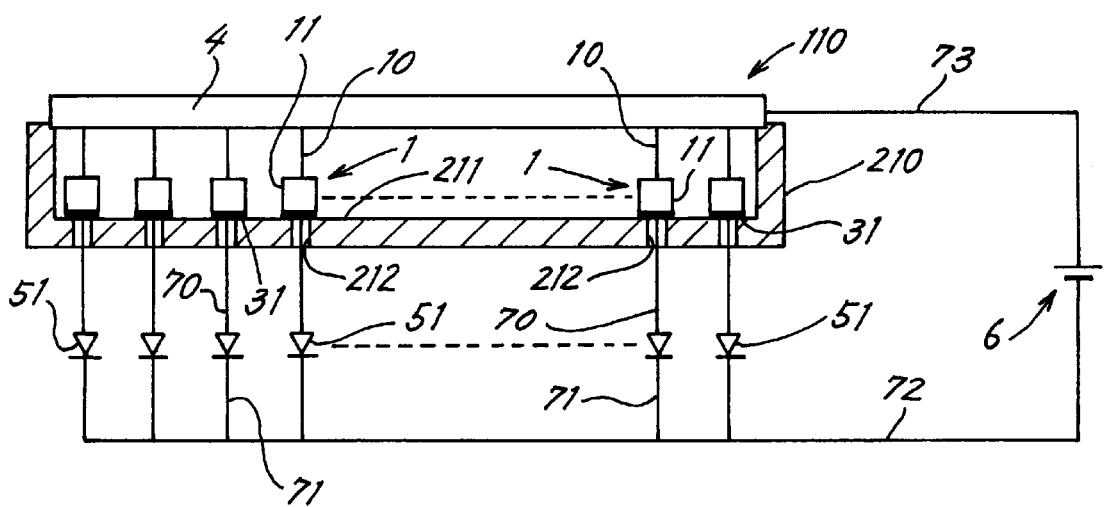
FIG. 5 is a diagram showing another embodiment of aging apparatus.

FIG. 5 is a diagram showing another apparatus 110 for aging a multiplicity of capacitor elements 1. The apparatus 110 differs from the apparatus 100 of FIG. 4 in that a carbon sheet 31 and a current limiter 51 are arranged for each of the capacitor elements 1 individually. With the exception of this feature, the apparatus 110 has the same construction as the apparatus 100 of FIG. 4. The carbon sheets 31 are arranged on the bottom surface 211 of a box 210 in corresponding relation with the respective capacitor elements 1 in position. The carbon sheets 31 are spaced apart and thereby held out of conduction with one another. Each carbon sheet 31 is in the form of a flat plate prepared from a conductive material containing graphite, and has approximately the same area as the bottom face of the capacitor element 1.

A bore 212 extends downward through the bottom wall of the box 210 at the position where each of the carbon sheets 31 is disposed. Conductors 70 connected to the respective carbon sheets 31 extend through the respective bores 212 and are connected to individual current limiters 51, which in turn are electrically connected to the negative electrode of a power source 6.

Thus, each capacitor element 1 and the current limiter 51 connected to the element 1 are connected in parallel with the power source 6.

Like the apparatus 100 of FIG. 4, the apparatus 110 of the foregoing construction is used for the first aging treatment by heating the carbon sheets 31 or the air inside the box 210 to a predetermined temperature with the heating means, and applying a rated voltage by the power source 6 to the capacitor elements 1 for a specified period of time.

With the apparatus 100 and 110 of the first and second embodiments described, it is likely that the capacitor elements 1 attached to the carrier bar 4 will include those wherein the dielectric oxide film is irreparably broken before or during the first aging treatment, short-circuiting the anode body and the cathode layer. In such an event, the apparatus 100 of the first embodiment is unable to apply the rated voltage to the capacitor elements 1 other than those short-circuited, failing to conduct the aging treatment effectively. Every time one of the capacitor elements 1 becomes short-circuited, therefore, there arises a need to suspend the aging treatment, check the capacitor elements individually and remove the shorted element.

With the apparatus 110 of the second embodiment, however, the rated voltage is applied to the current limiter 51 connected to the shorted capacitor element 1, and the current to be passed through the shorted element 1 is limited by the current limiter 51. Consequently, even if some capacitor elements 1 become short-circuited, the apparatus 110 of the second embodiment, unlike the apparatus 100 of the first embodiment, is capable of applying the rated voltage to the other capacitor elements 1 to continue the first aging treatment, hence an improved production efficiency.

The apparatus 110 of the second embodiment may have an ammeter as provided on each conductor 70 for measuring the current value of the capacitor element 1 or of the current limiter 51. The current through the capacitor element 1 is normally several microamperes or at least several milliamperes in the event of short-circuiting. Accordingly, the short-circuited capacitor element 1 can be readily identified from the reading on the ammeter provided on the conductor 70 concerned. As a result, the faulty capacitor element 1 can be excluded upon completion of the first aging treatment without being further processed, whereby a higher production efficiency can be achieved.

Similarly in the case of the apparatus 110 of the second embodiment, the power source 6 may be connected to the carrier bar 4 via an ammeter for measuring the output current value of the power source 6, or may have the function of measuring the output current value. In this case, the output current value of the power source 6 is the sum of the value (several microamperes) of current through the capacitors 1 free of short-circuiting and the limit value (on the order of milliamperes) of current through the current limiter 51 connected to the shorted capacitor element 1, so that the number of shorted capacitor elements 1 can be calculated by measuring the output current value of the power source 6. The incidence of rejects can therefore be calculated for all the capacitor elements 1 within the box 2, and also for every lot, with the quantity of all capacitor elements 1 within the box 1 taken as one lot. This makes it possible to exclude every lot of high rate of rejection so as to produce capacitors efficiently with high reliability.

The foregoing description of embodiments is intended to illustrate the present invention and should not be construed as limiting the invention set forth in the appended claims or reducing the scope thereof. The process and apparatus of the invention are not limited to the embodiments but can of course be modified variously within the technical scope defined in the claims.

What is claimed is:

1. A process for producing an organic solid electrolyte capacitor including the steps of:

completing a capacitor element by forming a dielectric oxide film over an anode body of valve metal and forming a cathode layer of solid conductive organic material over the dielectric oxide film, subjecting the capacitor element to a first aging treatment by applying voltage between the anode body and the cathode layer, and forming a shell around the capacitor element which has been subjected to first aging treatment; and conducting a second aging treatment after the step of forming the shell.

2. A process for producing an organic solid electrolyte capacitor according to claim 1 wherein the step of completing the capacitor element is performed by attaching an anode lead to the anode body which is a sintered body, forming the dielectric oxide film over the anode body, forming the cathode layer of solid conductive organic material over the dielectric oxide film, and forming a carbon layer and then a silver paste layer over the cathode layer, and the step of conducting the first aging treatment is performed by placing the completed capacitor element on a conductive buffer layer, and applying a voltage to the capacitor element with the anode lead of the capacitor element serving as a positive electrode and with the buffer layer in contact with the silver paste layer of the capacitor element and serving as a negative electrode.

3. A process for producing an organic solid electrolyte capacitor according to claim 2 wherein the step of conducting the first aging treatment is performed by maintaining one of the ambient temperature of the capacitor element and the temperature of the surface of the buffer layer in contact with the capacitor element at a predetermined temperature.

4. A process for producing an organic solid electrolyte capacitor according to claim 3 wherein the predetermined temperature is about 125° C.

5. A process for producing an organic solid electrolyte capacitor according to claim 2 wherein the conductive buffer layer is a carbon sheet or an accumulation of granular carbon.

6. A process for producing an organic solid electrolyte capacitor according to claim 5 wherein the conductive buffer layer is the carbon sheet, and the carbon sheet is in the form of felt having a thickness of 5 to 20 mm, a density of 0.1 to 0.2 g/cm$^3$ and a volume resistivity of up to 7 ohm-cm.

7. A process for producing an organic solid electrolyte capacitor according to claim 5 wherein the carbon sheet for use in the step of conducting the aging treatment comprises a plurality of carbon sheet pieces so arranged as to be held out of conduction with one another, the capacitor element being placed on each of the carbon sheet pieces and provided with a current limiter for restricting the current through the element so as not to allow excessive current to pass the capacitor element.

8. A process for producing an organic solid electrolyte capacitor according to claim 7 wherein the value of current flowing through each capacitor element is measured to detect a short-circuited capacitor element.

9. A process for producing an organic solid electrolyte capacitor according to claim 7 wherein the sum of the values of current flowing through the respective capacitor elements is measured.

10. A process for producing an organic solid electrolyte capacitor according to claim 2 wherein the current flowing through the capacitor element in the step of conducting the first aging treatment is restricted to not to allow excessive current to pass the capacitor element.

11. An apparatus for aging a plurality of capacitor elements each completed by attaching an anode lead to an anode body in the form of a sintered body of valve metal, forming a dielectric oxide film over the anode body, forming a cathode layer of solid conductive organic material over the dielectric oxide film, and forming a carbon layer and then a silver paste layer over the cathode layer, the aging apparatus comprising:

a box for accommodating the plurality of capacitor elements, a conductive buffer layer provided inside the box, a conductive holding member disposed on the box for attaching thereto the outer end of the anode lead of each of the capacitor elements, with the silver paste layer of the capacitor element in contact with the buffer layer, a current limiter connected to the buffer layer for restricting the current to be passed through the capacitor element so as not to allow excessive current to pass the capacitor element, and a power source having a positive electrode connected to the holding member and a negative electrode connected to the current limiter wherein the conductive buffer layer is a carbon sheet or an accumulation of granular carbon.

12. An aging apparatus according to claim 11 which comprises means for heating the interior of the box or the surface of the buffer layer in contact with the capacitor elements at a predetermined temperature.

13. An aging apparatus according to claim 12 wherein the predetermined temperature is about 125° C.

14. An aging apparatus according to claim 11 wherein the conductive holding member is a carrier bar for attaching thereto the outer ends of anode leads of a multiplicity of anode bodies to transport the anode bodies to various apparatus for producing capacitor elements.

15. An aging apparatus according to claim 12 wherein the conductive buffer layer is the carbon sheet, and the carbon sheet is in the form of felt having a thickness of 5 to 20 mm, a density of 0.1 to 0.2 g/cm$^3$ and a volume resistivity of up to 7 ohm-cm.

16. An aging apparatus according to claim 12 wherein the conductive buffer layer is the carbon sheet, and the carbon sheet comprises a plurality of carbon sheet pieces provided in the box for the respective capacitor elements and so arranged as to be held out of conduction with one another, the conductive holding member being provided on the box so that the silver paste layers of the capacitor elements come into contact with the corresponding carbon sheet pieces respectively, the current limiter comprising a plurality of current limiters connected to the respective carbon sheet pieces, the negative electrode of the power source being connected to the current limiters.

17. An aging apparatus according to claim 16 which comprises leakage current measuring means for measuring the values of current flowing through the respective capacitor elements or the respective current emitters.

18. An aging apparatus according to claim 17 which comprises means for measuring the output current value of the power source.

* * * * *